US012558690B2

(12) United States Patent
Chen et al.

(10) Patent No.: US 12,558,690 B2
(45) Date of Patent: Feb. 24, 2026

(54) METHOD OF ELECTROWETTING

(71) Applicant: Nuclera Ltd, Cambridge (GB)

(72) Inventors: Michael Chun Hao Chen, Cambridge (GB); Sumit Kalsi, Cambridge (GB); Laurence Livingstone Bell, Cambridge (GB); Gordon Ross McInroy, Cambridge (GB); David Zhitomirsky, Woburn, MA (US); Luke M. Slominski, Sharon, MA (US); Richard J. Paolini, Jr., Framingham, MA (US); Cristina Visani, Cambridge, MA (US)

(73) Assignee: Nuclera, LTD., Cambridge (GB)

( * ) Notice: Subject to any disclaimer, the term of this patent is extended or adjusted under 35 U.S.C. 154(b) by 707 days.

(21) Appl. No.: 17/918,871

(22) PCT Filed: Apr. 14, 2021

(86) PCT No.: PCT/GB2021/050896

§ 371 (c)(1),
(2) Date: Oct. 13, 2022

(87) PCT Pub. No.: WO2021/209751

PCT Pub. Date: Oct. 21, 2021

(65) Prior Publication Data

US 2023/0372939 A1 Nov. 23, 2023

(30) Foreign Application Priority Data

Apr. 14, 2020 (GB) ...................................... 2005399

(51) Int. Cl.
*B01L 3/00* (2006.01)

(52) U.S. Cl.
CPC . *B01L 3/502792* (2013.01); *B01L 2300/0645* (2013.01); *B01L 2300/0654* (2013.01);
(Continued)

(58) Field of Classification Search
CPC ....... B01L 3/502792; B01L 2300/0645; B01L 2300/0654; B01L 2300/0816;
(Continued)

(56) References Cited

U.S. PATENT DOCUMENTS

| | | | | |
|---|---|---|---|---|
| 11,806,715 B2 * | 11/2023 | Chen | ................. | B01L 3/502761 |
| 2003/0183525 A1 * | 10/2003 | Elrod | .................. | B01F 33/3031<br>366/349 |

(Continued)

FOREIGN PATENT DOCUMENTS

| | | |
|---|---|---|
| EP | 3409366 A1 | 12/2018 |
| WO | 2006/044966 A1 | 4/2006 |

(Continued)

OTHER PUBLICATIONS

Japanese Office Action for Application No. 2022-562316, dated May 23, 2025, 6 pages.

(Continued)

*Primary Examiner* — Brian J. Sines
(74) *Attorney, Agent, or Firm* — McCarter & English, LLP

(57) ABSTRACT

A method for moving an aqueous droplet comprising providing an electrokinetic device including a first substrate having a matrix of electrodes, wherein each of the matrix electrodes is coupled to a thin film transistor, and wherein the matrix electrodes are overcoated with a functional coating comprising: a dielectric layer in contact with the matrix electrodes, a conformal layer in contact with the dielectric layer, and a hydrophobic layer in contact with the conformal layer; a second substrate comprising a top electrode; a spacer disposed between the first substrate and the second substrate and defining an electrokinetic workspace; and a voltage source operatively coupled to the matrix electrodes. The method further comprises disposing an aqueous droplet
(Continued)

on a first matrix electrode; and providing a differential electrical potential between the first matrix electrode and a second matrix electrode with the voltage source, thereby moving the aqueous droplet.

20 Claims, 4 Drawing Sheets

(52) U.S. Cl.
CPC .................. *B01L 2300/0816* (2013.01); *B01L 2300/0887* (2013.01); *B01L 2300/161* (2013.01); *B01L 2400/0424* (2013.01); *B01L 2400/0427* (2013.01)

(58) Field of Classification Search
CPC ....... B01L 2300/0887; B01L 2300/161; B01L 2400/0424; B01L 2400/0427; B01L 3/502761; B01L 3/502784; B01L 7/52; B01L 2200/0663
See application file for complete search history.

(56) References Cited

U.S. PATENT DOCUMENTS

| | | | | |
|---|---|---|---|---|
| 2004/0055536 | A1* | 3/2004 | Kolar | B01L 3/0241 506/40 |
| 2007/0023292 | A1* | 2/2007 | Kim | B01F 33/3031 204/547 |
| 2007/0242111 | A1* | 10/2007 | Pamula | B41J 2/17509 347/81 |
| 2007/0243634 | A1* | 10/2007 | Pamula | B01L 3/502761 436/518 |
| 2013/0333762 | A1* | 12/2013 | Winger | B01L 3/0268 137/803 |
| 2015/0277101 | A1 | 10/2015 | Novoselov et al. | |
| 2016/0296935 | A1 | 10/2016 | Gao et al. | |
| 2019/0126279 | A1* | 5/2019 | Gach | B01L 3/502792 |
| 2020/0012089 | A1 | 1/2020 | Hadwen et al. | |
| 2021/0220830 | A1 | 7/2021 | Zhitomirsky et al. | |
| 2023/0057330 | A1 | 2/2023 | Chen et al. | |

FOREIGN PATENT DOCUMENTS

| | | | |
|---|---|---|---|
| WO | 2013/110146 | A2 | 8/2013 |
| WO | 2016/090295 | A1 | 6/2016 |
| WO | 2018/200872 | A1 | 11/2018 |

OTHER PUBLICATIONS

International Search Report and Written Opinion for Application No. PCT/GB2021/050896, dated Jul. 13, 2021, 13 pages.
Great Britain Office Action for Application No. GB2005399.7, dated Sep. 22, 2020, 1 page.

* cited by examiner

METHOD OF ELECTROWETTING

REFERENCE TO RELATED APPLICATIONS

This application is a U.S. national stage filing under 35 U.S.C. § 371 based on International Patent Application No. PCT/GB2021/050896, filed on Apr. 14, 2021, which claims priority to GB Patent Application No. 2005399.7, filed on Apr. 14, 2020. The contents of each of the aforementioned applications are hereby incorporated by reference in their entireties.

FIELD OF THE INVENTION

This invention is in the field of fluid electrokinetics: Electrowetting-on-dielectric (EWoD) and Dielectrophoresis (DEP); and the devices using these phenomena. The invention relates to enhancing the performance and durability of the device lifetime and operations through the coating of a conformal layer on top of the dielectric or insulator stack.

BACKGROUND

The manipulation of droplets by the application of electrical potential can be achieved on electrodes covered with an insulator or a dielectric or a series of insulators or dielectrics. Droplet manipulation as a result of an applied electrical potential is known as electrowetting. Electrokinesis occurs as result of a non-uniform electric field that influences the hydrostatic equilibrium of a dielectric liquid (dielectrophoresis or DEP) or a change in the contact angle of the liquid on solid surface (electrowetting-on-dielectric or EWoD). DEP can also be used to create forces on polarizable particles to induce their movement. The electrical signal can be transmitted to a discrete electrode, a transistor, an array of transistors, or a sheet of semiconductor film whose electrical properties can be modulated by an optical signal.

EWoD phenomena occur when droplets are actuated between two parallel electrodes covered with a hydrophobic insulator or dielectric. The electric field at the electrode-electrolyte interface induces a change in the surface tension, which results in droplet motion as a result of a change in droplet contact angle. The electrowetting effect can be quantitatively treated using Young-Lippmann equation:

$$\cos\theta - \cos\theta_0 = (\tfrac{1}{2}\gamma LG) c \cdot V^2$$

where $\theta_0$ is the contact angle when the electric field across the interfacial layer is zero, γLG is the liquid-gas tension, c is the specific capacitance (given as $\varepsilon_r \cdot \varepsilon_0/t$, where $\varepsilon_r$ is dielectric constant of the insulator/dielectric, $\varepsilon_0$ is permittivity of vacuum, t is thickness) and V is the applied voltage or electrical potential. The change in contact angle (inducing droplet movement) is thus a function of surface tension, electrical potential, dielectric thickness, and dielectric constant.

When a droplet is actuated by EWoD, there are two opposing sets of forces that act upon it: an electrowetting force induced by electric field and resistant forces that include the drag forces resulting from the interaction of the droplet with filler medium and the contact line friction (ref). The minimum voltage applied to balance the electrowetting force with the sum of all drag forces (threshold voltage) is variably determined by the thickness-to-dielectric contact ratio of the insulator/dielectric, $(t/\varepsilon_r)^{1/2}$. Thus, to reduce actuation voltage, it is required to reduce $(t/\varepsilon_r)^{1/2}$ (i.e., increase dielectric constant or decrease insulator/dielectric thickness). To achieve low voltage actuation, thin insulator/dielectric layers must be used. However, the deposition of high quality thin insulator/dielectric layers is a technical challenge, and these thin layers are easily damaged before the desired electrowetting contact angle is large enough to drive the droplet is achieved. Most academic studies thus report the use of much higher voltages >100V on easily fabricated, thick dielectric films (>3 μm) to effect electrowetting.

High voltage EWoD-based devices with thick dielectric films, however, have limited industrial applicability largely due to their limited droplet multiplexing capability. The use of low voltage devices including thin-film transistors (TFT) and optically-activated amorphous silicon layers (a-Si) have paved the way for the industrial adoption of EWoD-based devices due to their greater flexibility in addressing electrical signals in a highly multiplex fashion. The driving voltage for TFTs or optically-activated a-Si are low (typically <15 V). The bottleneck for fabrication and thus adoption of low voltage devices has been the technical challenge of depositing high quality, thin film insulators/dielectrics. Hence there has been a particular need for improving the fabrication and composition of thin film insulator/dielectric devices.

Typically, the electrodes (or the array elements) used for EWoD are covered with (i) a hydrophilic insulator/dielectric and a hydrophobic coating or (ii) a hydrophobic insulator/dielectric. Commonly used hydrophobic coatings comprise of fluoropolymers such as Teflon AF 1600 or CYTOP. The thickness of this material as a hydrophobic coating on the dielectric is typically <100 nm and can have defects in the form of pinholes or a porous structure; hence, it is particularly important that the insulator/dielectric is pinhole free to avoid electrical shorting. Teflon has also been used as an insulator/dielectric, but it has higher voltage requirements due to its low dielectric constant and the thickness required to make it pinhole free. Other hydrophobic insulator/dielectric materials can include polymer-based dielectrics such as those based on siloxane, epoxy (e.g. SU-8), or parylene (e.g., parylene N, parylene C, parylene D, or parylene HT). Due to minimal contact angle hysteresis and a higher contact angle with aqueous solutions, Teflon is still used as a hydrophobic topcoat on these insulator/dielectric polymers. However, there are difficulties in reliably producing <1 micron pinhole-free coatings of parylene or SU-8; thus, the thickness of these materials is typically kept at a 2-5 microns at the cost of increased voltage requirements for electrowetting. It has also been reported that traditional EWoD devices with parylene C are easily broken and unstable for repeated droplet manipulation with cell culture medium. Multi-layer insulator devices deposited with metal-oxide and parylene C films have been used to produce a more robust insulator/dielectric and enable operations with lower applied voltages. Inorganic materials, such metal oxides and semiconductor oxides, commonly used in the CMOS industry as “gate dielectrics”, have been used as insulator/dielectric for EWoD devices. They offer the advantage of utilizing standard cleanroom processes for thin film depositions (<100 nm). These materials are inherently hydrophilic, requiring an additional hydrophobic coating, and can be prone to pinhole formation as a result of thin film layer deposition process. Together with the need for lower voltage operations of EWoD, recent developmental work has focused on (1) using materials with improved dielectric properties (e.g., using high-dielectric constant insulators/dielectrics), (2) optimizing the fabrication process to make the insulator/dielectric pinhole free to avoid dielectric breakdown.

Operation of EWoD devices suffers from contact angle saturation and hysteresis, which is believed to be brought about by either one or combination of these phenomena: (1) entrapment of charges in the hydrophobic film or insulator/dielectric interface, (2) adsorption of ions, (3) thermodynamic contact angle instabilities, (4) dielectric breakdown of dielectric layer, (5) the electrode-electrode-insulator interface capacitance (arising from the double layer effect), and (6) fouling of the surface (such as by biomacromolecules). One of the adverse effects of this hysteresis is reduced operational lifetime of the EWoD-based device.

Contact angle hysteresis is believed to be a result of charge accumulation at the interface or within the hydrophobic insulator after several operations. The required actuation voltage increases due to this charging phenomenon resulting in eventual catastrophic dielectric breakdown. The most probable explanation is that pinholes at the insulator/dielectric may allow the liquid to come into contact with the electrode causing electrolysis. Electrolysis is further facilitated by pinhole-prone or porous hydrophobic insulators.

Most of the studies to understand contact angle hysteresis on EWoD have been conducted on short time scales and with low conductivity solutions. Long duration actuations (e.g., >1 hour) and high conductivity solutions (e.g., 1 M NaCl) could produce several effects other than electrolysis. The ions in solution can permeate through the hydrophobic coat (under the applied electric field) and interact with the underlying insulator/dielectric. Ion permeation can result in (1) change in dielectric constant due to charge entrapment (which is different from interfacial charging) and (2) change in surface potential of a pH sensitive metal oxide. Both can result in reduction of electrowetting forces to manipulate aqueous droplets, leading to contact angle hysteresis. The inventors have found that the damage from high conductivity solutions reduces or disables electrowetting on electrodes by inhibiting the modulation of contact angle when an electric field is applied.

It is therefore an object of the invention to provide a method for preventing contact angle saturation and hysteresis.

SUMMARY OF THE INVENTION

According to the invention there is provided a method for moving an aqueous droplet comprising providing an electrokinetic device including a first substrate having a matrix of electrodes, wherein each of the matrix electrodes is coupled to a thin film transistor, and wherein the matrix electrodes are overcoated with a functional coating comprising: a dielectric layer in contact with the matrix electrodes, a conformal layer in contact with the dielectric layer, and a hydrophobic layer in contact with the conformal layer; a second substrate comprising a top electrode; a spacer disposed between the first substrate and the second substrate and defining an electrokinetic workspace; and a voltage source operatively coupled to the matrix electrodes. The method further comprises disposing an aqueous droplet on a first matrix electrode; and providing a differential electrical potential between the first matrix electrode and a second matrix electrode with the voltage source, thereby moving the aqueous droplet.

The inventors discovered that contact angle hysteresis arising from high conductivity solutions or solutions deviating from neutral pH can be mitigated by depositing a conformal layer. The method and device can be used when the ionic strength is over 0.1M and over 1.0M.

The inventors have discovered that contact angle hysteresis on EWoD-based devices arising from high conductivity solutions or solutions deviating from neutral pH can be mitigated by depositing a thin protective parylene coating in between the insulating dielectric and the hydrophobic coating.

The ability to robustly actuate high ionic strength solutions for extended periods of time offers great utility to those wishing to conduct certain biochemical processes and experiments. High ionic strength solutions are commonly used as wash buffers to disrupt the interaction of nucleic acids and proteins, for example in the commonly performed chromatin immunoprecipitation (ChIP) assay. High ionic strength solutions can also be used for osmotic cell lysis. Additionally, the culture of marine algae is typically performed in media isotonic with seawater, with an ionic strength of 600-700 mM. A further application of high ionic strength solutions is for the elution of proteins from affinity matrices following purification. High ionic strength buffers are also used in enzymatic nucleic acid synthesis. Multiple high ionic strength solutions (1000 mM monovalent or greater) can be used in enzymatic DNA synthesis processes during both washing and deprotection steps.

The dielectric layer may comprise silicon dioxide, silicon oxynitride, silicon nitride, hafnium oxide, yttrium oxide, lanthanum oxide, titanium dioxide, aluminum oxide, tantalum oxide, hafnium silicate, zirconium oxide, zirconium silicate, barium titanate, lead zirconate titanate, strontium titanate, or barium strontium titanate. The dielectric layer may be between 10 nm and 100 μm thick. Combinations of more than one material may be used, and the dielectric layer may comprise more than one sublayer that may be of different materials.

Exemplary layers can be seen in application WO2020226985. Dielectric layers of the invention can be deposited on a substrate, for example a substrate including a plurality of electrodes disposed between the substrate and the layered dielectric. In some embodiments, the electrodes are disposed in an array and each electrode is associated with a thin film transistor (TFT). In some embodiments, a hydrophobic layer is deposited on the third layer, i.e., on top of the dielectric stack. In some embodiments, the hydrophobic layer is a fluoropolymer, which can be between 10 and 50 nm thick, and deposited with spin-coating or another coating method. Also described herein is a method for creating a layered dielectric of the type described above. The method includes providing a substrate, depositing a first layer using atomic layer deposition (ALD), depositing a second layer using sputtering, and depositing the third layer using ALD. (The first layer is deposited on the substrate, the second layer is deposited on the first layer, and the third layer is deposited on the second layer). The first ALD layer typically includes aluminum oxide or hafnium oxide and has a thickness between 9 nm and 80 nm. The second sputtered layer can include tantalum oxide or hafnium oxide and has a thickness between 40 nm and 250 nm. The third ALD layer typically includes tantalum oxide or hafnium oxide and has a thickness between 5 nm and 60 nm. In some embodiments, the atomic layer deposition comprises plasma-assisted atomic layer deposition. In some embodiments, the sputtering comprises radio-frequency magnetron sputtering. In some embodiments, the method further includes spin coating a hydrophobic material on the third layer.

Optionally the dielectric 'layer' may include multiple layers. The first layer may include aluminum oxide or hafnium oxide, and have a thickness between 9 nm and 80 nm. The second layer may include tantalum oxide or hafnium oxide, and have a thickness between 40 nm and 250 nm. The third layer may include tantalum oxide or hafnium oxide, and have a thickness between 5 nm and 60 nm. The second and third layers may comprise different materials, for example, the second layer can comprise primarily hafnium oxide while the third layer comprises primarily tantalum oxide. Alternatively, the second layer can comprise primarily tantalum oxide while the third layer comprises primarily hafnium oxide. In some embodiments, the first layer may be aluminum oxide. In preferred embodiments, the first layer is from 20 to 40 nm thick, while the second layer is 100 to 150 nm thick, and the third layer is 10 to 35 nm thick. The thickness of the various layers can be measured with a variety of techniques, including, but not limited to, scanning electron microscopy, ion beam backscattering, X-ray scattering, transmission electron microscopy, and ellipsometry.

The conformal layer may comprise a parylene, a siloxane, or an epoxy. It may be a thin protective parylene coating in between the insulating dielectric and the hydrophobic coating. Typically, parylene is used as a dielectric layer on simple devices. In this invention, the rationale for deposition of parylene is not to improve insulation/dielectric properties such as reduction in pinholes, but rather to act as a conformal layer between the dielectric and hydrophobic layers. The inventors find that parylene, as opposed to other similar insulating coatings of the same thickness such as PDMS (polydimethylsiloxane), prevent contact angle hysteresis caused by high conductivity solutions or solutions deviating from neutral pH for extended hours. The conformal layer may be between 10 nm and 100 μm thick.

Disclosed is a method for moving an aqueous droplet, comprising:

- providing an electrokinetic device, including:
  - a first substrate having a matrix of electrodes, wherein each of the matrix electrodes is coupled to a thin film transistor, and wherein the matrix electrodes are overcoated with a functional coating comprising:
    - one or more dielectric layer(s) comprising silicon nitride, hafnium oxide or aluminum oxide in contact with the matrix electrodes,
    - a conformal layer comprising parylene in contact with the dielectric layer, and a hydrophobic layer in contact with the conformal layer;
  - a second substrate comprising a top electrode;
    - a spacer disposed between the first substrate and the second substrate and defining an electrokinetic workspace; and
  - a voltage source operatively coupled to the matrix electrodes;
- providing an aqueous droplet on a first matrix electrode; and
  - providing a differential electrical potential between the first matrix electrode and a second matrix electrode with the voltage source, thereby moving the aqueous droplet between the first matrix electrode and the second matrix electrode.

The hydrophobic layer may comprise a fluoropolymer coating, fluorinated silane coating, manganese oxide polystyrene nanocomposite, zinc oxide polystyrene nanocomposite, precipitated calcium carbonate, carbon nanotube structure, silica nanocoating, or slippery liquid-infused porous coating.

The elements may comprise one or more of a plurality of array elements, each element containing an element circuit; discrete electrodes; a thin film semiconductor in which the electrical properties can be modulated by incident light; and a thin film photoconductor whose properties can be modulated by incident light.

The functional coating may include a dielectric layer comprising silicon nitride, a conformal layer comprising parylene, and a hydrophobic layer comprising an amorphous fluoropolymer.

This has been found to be a particularly advantageous combination.

The electrokinetic device may include a controller to regulate a voltage provided to the individual matrix electrodes. The electrokinetic device may include a plurality of scan lines and a plurality of gate lines, wherein each of the thin film transistors is coupled to a scan line and a gate line, and the plurality of gate lines are operatively connected to the controller. This allows all the individual elements to be individually controlled.

The second substrate may also comprise a second hydrophobic layer disposed on the second electrode. The first and second substrates may be disposed so that the hydrophobic layer and the second hydrophobic layer face each other, thereby defining the electrokinetic workspace between the hydrophobic layers.

The method is particularly suitable for aqueous droplets with a volume of 1 μL or smaller.

The present invention can be used to contact adjacent aqueous droplets by disposing a second aqueous droplet on a third matrix electrode and providing a differential electrical potential between the third matrix electrode and the second matrix electrode with the voltage source.

The invention further provides an assay, nucleic acid synthesis, nucleic acid assembly, nucleic acid amplification, nucleic acid manipulation, next-generation sequencing library preparation, protein synthesis, or cellular manipulation comprising repeating the method steps described above.

In particular the steps of disposing an aqueous droplet on a first matrix electrode; and providing a differential electrical potential are repeated many times. The movement of the droplets may be repeated more than 1000 times or more than 10,000 times. The method steps may be repeated more than 1000 times in 24 hours.

The EWoD-based devices shown and described below are active matrix thin film transistor devices containing a thin film dielectric coating with a Teflon hydrophobic top coat. These devices are based on devices described in the E Ink Corp patent filing on "Digital microfluidic devices including dual substrate with thin-film transistors and capacitive sensing", US patent application no 2019/0111433, incorporated herein by reference.

Described herein are electrokinetic devices, including:

- a first substrate having a matrix of electrodes, wherein each of the matrix electrodes is coupled to a thin film transistor, and wherein the matrix electrodes are overcoated with a functional coating comprising:
- a dielectric layer in contact with the matrix electrodes,
- a conformal layer in contact with the dielectric layer, and
- a hydrophobic layer in contact with the conformal layer;
  - a second substrate comprising a top electrode;
  - a spacer disposed between the first substrate and the second substrate and defining an electrokinetic workspace; and
  - a voltage source operatively coupled to the matrix electrodes;

The electrokinetic devices as described may be used with other elements, such as for example devices for heating and cooling the device or reagent cartridges for the introduction of reagents as needed.

The devices can be used for any biochemical assay process involving high solute (ionic) strength solutions where the high concentration of ions would otherwise degrade and prevent use of prior art devices. The devices are particularly advantageous for processes involving the synthesis of biomolecules such as for example nucleic acid synthesis, for example using template independent strand extensions, or cell-free protein expression using a population of different nucleic acid templates.

FIGURES

DETAILED DESCRIPTION

Figure 1:
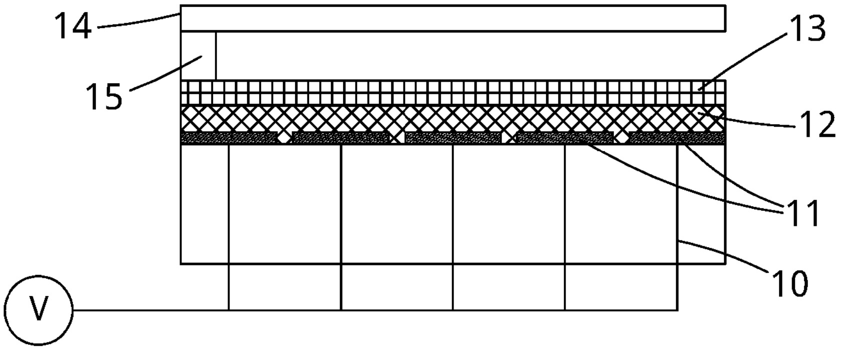
FIG. 1 shows cross sectional schematic for a traditional EWoD device.

FIG. 1 depicts a conventional electrowetting device with a substrate 10 and a plurality of individually controllable elements 11. The individually controllable elements may be arranged in an array such that multiple droplets may be manipulated simultaneously. The electrical properties of the individually controllable elements 11 can be varied. For example, each individually controllable element may comprise an electrode or a circuit. As shown in FIG. 1, each individually controllable element is connected to a voltage source. Alternatively, each element may comprise a thin film semiconductor in which the electrical properties can be modulated by incident light or a thin film photoconductor whose properties can be modulated by incident light.

Covering the individually controllable elements 11 is a dielectric layer 12. As an alternative to the dielectric layer 12 there may be an insulator. The insulator/dielectric may be made of $SiO_2$, silicon oxynitride, $Si_3N_4$, hafnium oxide, yttrium oxide, lanthanum oxide, titanium dioxide, aluminum oxide, tantalum oxide, hafnium silicate, zirconium oxide, zirconium silicate, barium titanate, lead zirconate titanate, strontium titanate, barium strontium titanate, parylene siloxane, epoxy or a mixture thereof. The insulator/dielectric layer has a thickness of 10-10,000 nm.

On top of the insulator 12 (or dielectric) is a hydrophobic coat 13. The hydrophobic coat may comprise a fluoropolymer such as, for example, Teflon, CYTOP or PTFE. The hydrophobic coating layer may be made of an amorphous fluoropolymer or siloxane or organic silane. The hydrophobic layer has a thickness of 1-1,000 nm.

A second electrode 14 is positioned opposite the array of individually controllable elements and the second electrode and the individually controllable elements are separated by a spacer which defines an electrokinetic workspace.

Figure 2:
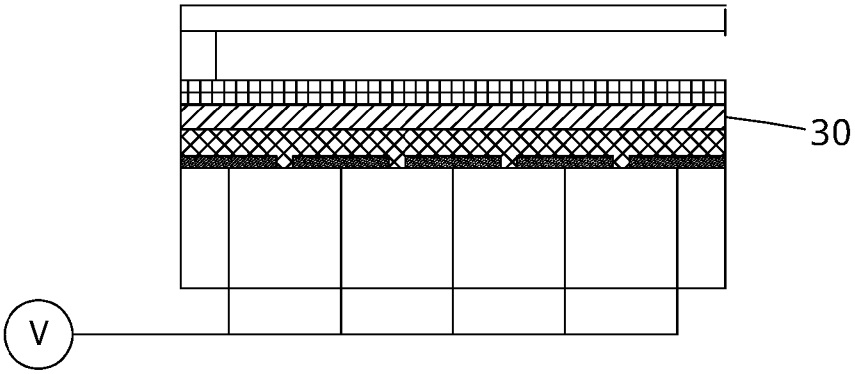
FIG. 2 shows a cross section of a device according to the invention.

FIG. 2 depicts an electrowetting device according to the invention in which, on top of the individually controllable elements is a functional coating comprising three component parts: a dielectric layer 12, a conformal layer 30 and a hydrophobic layer 13. According to an embodiment the conformal coat is made of parylene, or preferably parylene C. The conformal layer 30 has a thickness of 10-10,000 nm and prevents ions from interacting with the insulator/dielectric layer 12. The second electrode 14 may comprise a second hydrophobic layer facing the (first) hydrophobic layer. The electrokinetic workspace is then formed between the hydrophobic layers.

In order to promote adhesion between the different layer gaseous precursors are often used. This can be used when the layers are deposited using a spin coating or a dip coating.

Figure 3:
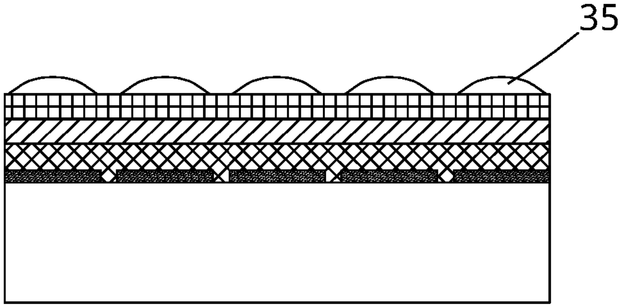
FIG. 3 depicts a device according to the invention with voltages applied and droplets.

An aqueous solution of 1M is applied to the substrate and a voltage applied. Through the application of a voltage the aqueous solution forms droplets 35 above the individually controllable elements, as shown in FIG. 3.

Figure 4:
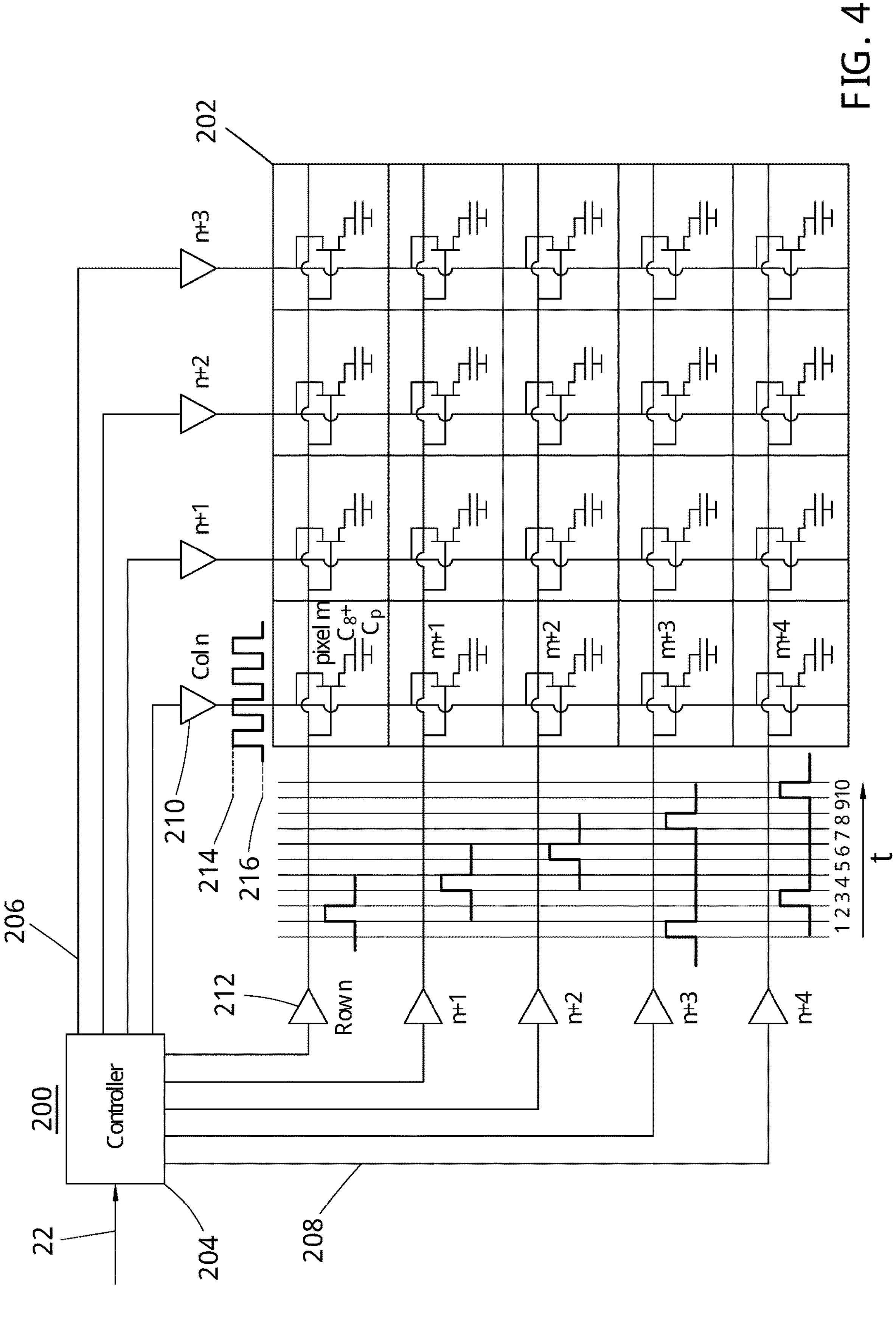
FIG. 4 depicts an active matrix as used in conjunction with the invention.

FIG. 4 depicts an array of individually controllable elements forming an electrode array 202. FIG. 4 is a diagrammatic view of an exemplary driving system 200 for controlling droplet operation by an AM-EWoD propulsion electrode array 202. The AM-EWoD driving system 200 may be in the form of an integrated circuit adhered to a support plate. The elements of the EWoD device are arranged in the form of a matrix having a plurality of data lines and a plurality of gate lines. Each element of the matrix contains a TFT for controlling the electrode potential of a corresponding electrode, and each TFT is connected to one of the gate lines and one of the data lines. The electrode of the element is indicated as a capacitor Cp. The storage capacitor Cs is arranged in parallel with Cp and is not separately shown in FIG. 4.

The controller shown comprises a microcontroller 204 including control logic and switching logic. It receives input data relating to droplet operations to be performed from the input data lines 22. The microcontroller has an output for each data line of the EWoD matrix, providing a data signal. A data signal line 206 connects each output to a data line of the matrix. The microcontroller also has an output for each gate line of the matrix, providing a gate line selection signal. A gate signal line 208 connects each output to a gate line of the matrix. A data line driver 210 and a gate line driver 212 is arranged in each data and gate signal line, respectively. The figure shows the signals lines only for those data lines and gate lines shown in the figure. The gate line drivers may be integrated in a single integrated circuit. Similarly, the data line drivers may be integrated in a single integrated circuit. The integrated circuit may include the complete gate driver assembly together with the microcontroller.

The integrated circuit may be integrated on a support plate of the AM-EWoD device. The integrated circuit may include the entire AM-EWoD device driving system.

The data line drivers provide the signal levels corresponding to a droplet operation. The gate line drivers provide the signals for selecting the gate line of which the electrodes are to be actuated. A sequence of voltages of one of the data line drivers 210 is shown in FIG. 4.

As illustrated in FIG. 4, traditional AM-EWoD cells use line-at-a-time addressing, in which one gate line n is high while all the others are low. The signals on all of the data lines are then transferred to all of the pixels in row n. At the end of the line time gate line n signal goes low and the next gate line n+1 goes high, so that data for the next line is transferred to the TFT pixels in row n+1. This continues with all of the gate lines being scanned sequentially so the whole matrix is driven. This is the same method that is used in almost all AM-LCDs, such as mobile phone screens, laptop screens and LC-TVs, whereby TFTs control the voltage maintained across the liquid crystal layer, and in AM-EPDs (electrophoretic displays).

Figure 5B:
FIG. 5B shows an array of elements coated in parylene C and without any defects.
Figure 5A:
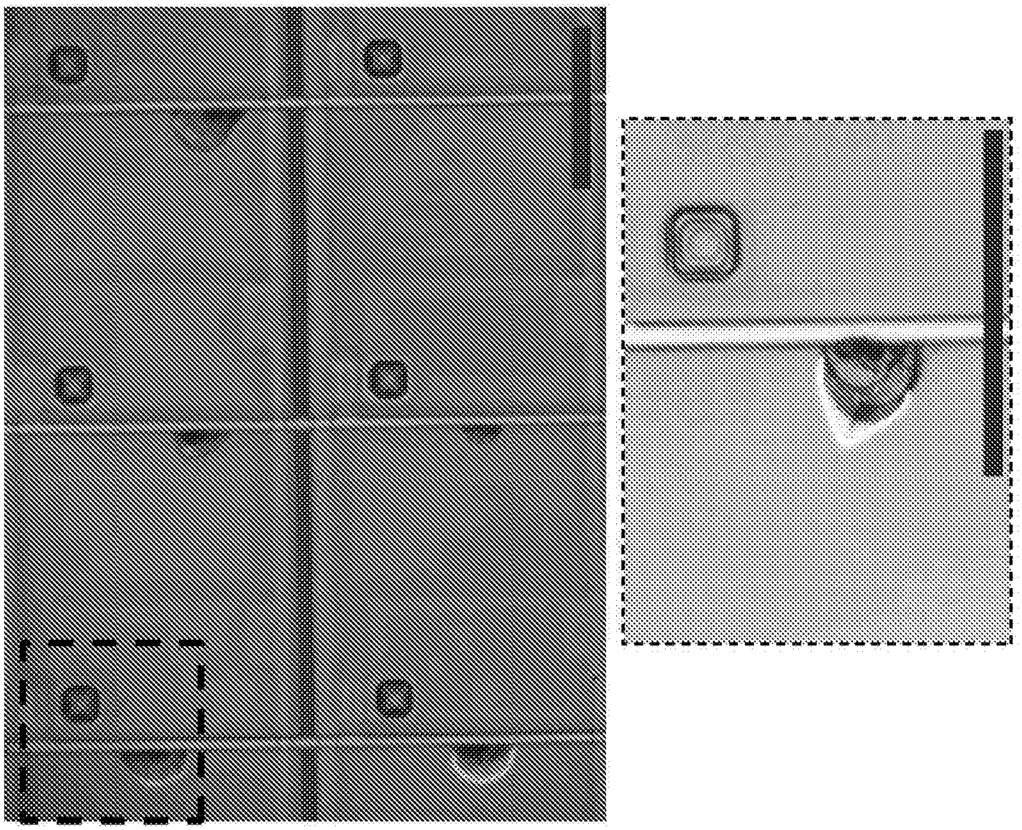
FIG. 5A shows degradation of array elements on a device without any conformal layer.

FIG. 5A depicts an array of elements on an AM-EWoD device without a conformal layer. A driving voltage has been applied to high ionic strength solutions and, as can be seen, results in damage and defects around the edge of some of the elements. An example is highlighted in a dotted line box. The result of this damage is failure of to perform EWoD actuation of an aqueous droplet in the area, further failure of an aqueous droplet to wet the area, and/or also general failures to dispense or split from an existing droplet to form two droplets.

FIG. 5B shows an array of elements, similar to those depicted in FIG. 5A but coated in parylene C. Again, a driving voltage has been applied to high ionic strength droplets but did not result in the defects seen in FIG. 5A. The result of the conformal coating is the lack of damage seen in FIG. 5A resulting in the ability of an aqueous droplet to wet the area and/or dispense or split from an existing droplet to form two droplets in areas of an AM-EWoD device contacted by high ionic strength droplets.

EXPERIMENTAL DETAILS

Adhesion Promotion

Adding 0.5% v/v Silane A-174 to a 1:1 ratio of isopropanol/water and stirring for 30 seconds formed solution 1. Solution 1 was left to stand for at least 2 hours to fully react and was used within 24 hours. Substrates were immersed in the Solution 1 for 30 minutes, while ensuring the flex strips of the TFT arrays were kept dry. Substrates were removed and air dried for 15 minutes and then cleaned in isopropanol for 15-30 seconds with agitation using tweezers. Substrates were dried with an air gun and stored in a Teflon box for Parylene C coating within 30 hours.

Parylene Coating

Prepared substrates (silanised and non-silanised) were arranged face up on a rotating stage alongside a clean glass slide within the deposition chamber of a thoroughly clean SCS Labcoter 2 and the chamber was sealed. 50 mg of Parylene C dimer was weighed into a disposable aluminium boat and loaded into the sublimation chamber. The system was sealed and pumped down to 50 milliTorr before liquid nitrogen was added to the cold trap. The system continued to evacuate throughout the deposition process. The sublimation chamber was heated to 175° C. and the heater cycled to maintain a target pressure of 0.1 Torr. The sublimation chamber was connected to the deposition chamber by a pyrolysis zone which was heated to 690° C. at a target pressure of 0.5 Torr. The deposition zone remained at ambient temperature, circa 25° C., and around 50 milliTorr. The system was maintained at temperature and pressure for two hours. The system was allowed to return gradually to ambient temperature over 30-40 minutes before the stage and vacuum pump were turned off and the system vented. The samples were removed from the deposition chamber and the coating thickness verified as circa 100 nm by profilometry.

Figure 6:
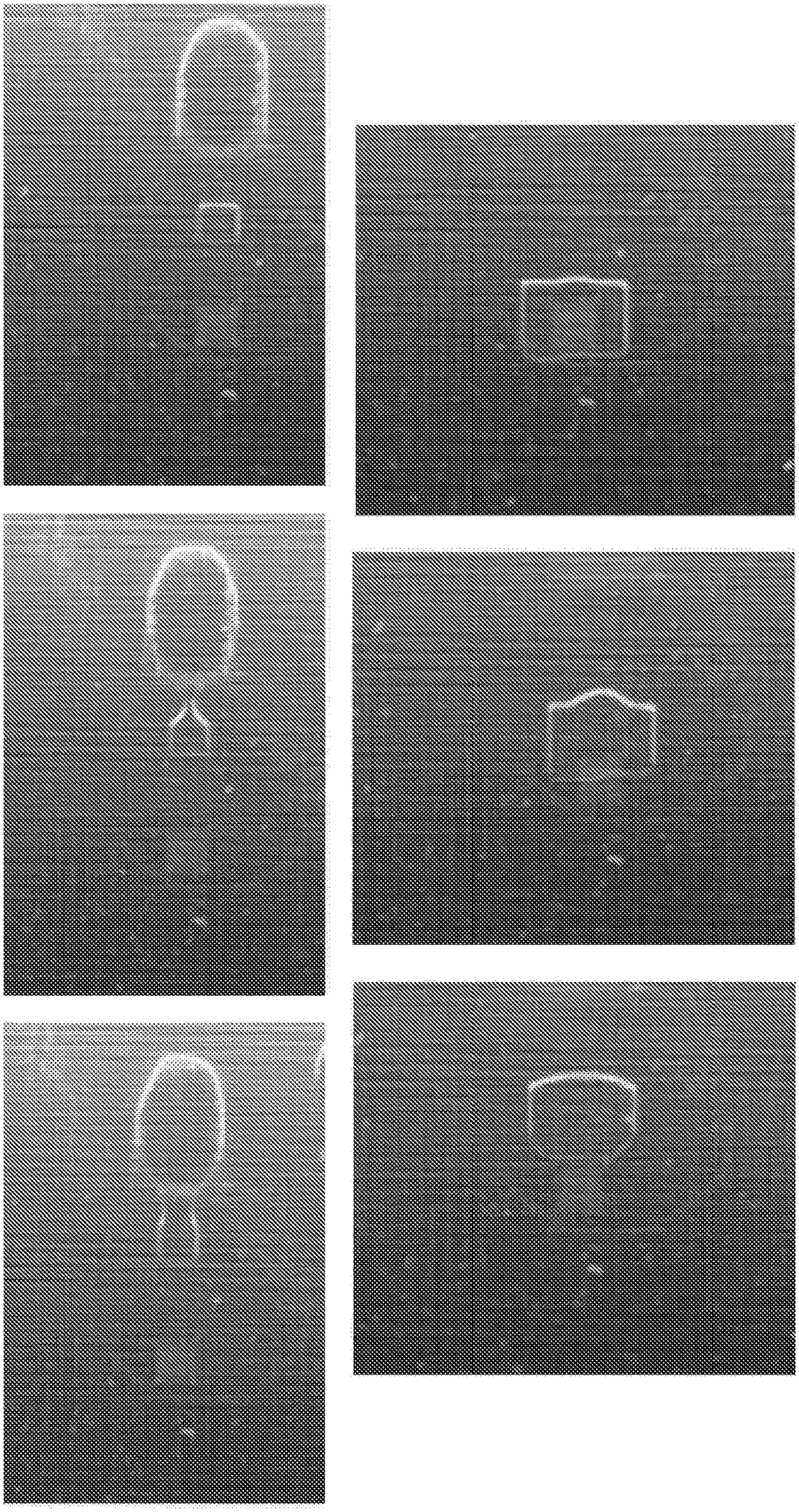
FIG. 6 depicts an image sequence demonstrating droplet formation on a device according to the invention.

The device was then subjected to 22 hours of continuous operation with a high salt solution. FIG. 6 depicts the reliable dispensation of a droplet through electrowetting actuation even after 22 hours of continuous operation (dispensing electrowetting actuation shown from FIG. 6 top left to top middle to top right images), as opposed to an AM-EWoD device shown in FIG. 5A. Even after this the droplet can be moved over the continuously actuated area (shown in FIG. 6 bottom left to bottom middle to bottom right images).

APPLICATIONS OF THE INVENTION

The invention can be used in a myriad of different applications. In particular the invention can be used to move cells, nucleic acids, nucleic acid templates, proteins, initiation oligonucleotide sequences for nucleic acid synthesis, beads, magnetic beads, cells immobilised on magnetic beads, or biopolymers immobilised on magnetic beads.

In these applications the steps of disposing an aqueous droplet having an ionic strength on a first matrix electrode and providing a differential electrical potential may be repeated many times. They may be repeated over 1000 times or over 10,000 times, sometimes over a 24 hour period.

The present method can be used in the synthesis of nucleic acids, such as phosphoramidite-based nucleic acid synthesis, templated or non-templated enzymatic nucleic acid synthesis, or more specifically, terminal deoxynucleotidyl transferase (TdT) mediated addition of 3'-O-reversibly terminated nucleoside 5'-triphosphates to the 3'-end of 5'-immobilized nucleic acids. During enzymatic nucleic acid synthesis, the following steps are taken on the instrument:

I. Addition solution containing TdT, optionally pyrophosphatase (PPiase), 3'-O-reversibly terminated dNTPs, and required buffer (including salts and necessary reaction components such as metal divalents) is brought to a reaction zone containing an immobilized nucleic acid, where the nucleic acid is immobilized on a surface such as through magnetic beads via a covalent linkage to the 5' terminus of the nucleic acid. The initial immobilized nucleic acid may be known as an initiator oligonucleotides and comprises N nucleotides, for example 3-100 nucleotides, preferably 10-80 nucleotides, and more preferably 20-65 nucleotides. Initiator oligonucleotides may contain a cleavage site, such as a restriction site or a non-canonical DNA base such as U or 8-oxoG. Addition solution may optionally contain a phosphate sensor, such as *E. coli* phosphate-binding protein conjugated to MDCC fluorophore, to assess the quality of nucleic acid synthesis as a fluorescent output. dNTPs can be combined in ratios to make DNA libraries, such as NNK syntheses.

II. Wash solution, either in bulk or in discrete droplets, is applied to reaction zones to wash away the addition solution. Wash solution typically has a high solute concentration (>1 M NaCl).

III. Deprotection solution, either in bulk or in discrete droplets, is applied to reaction zones to deprotect the 3'-O-reversible terminator added to the immobilized nucleic acids in the immobilized nucleic acid zone in step I. Deprotection solution typically has a high solute concentration.

IV. Wash solution, either in bulk or in discrete droplets, is applied to reaction zones to wash away the deprotection solution.

V. Steps I-IV are repeated until desired sequences are synthesized, for example steps I-IV are repeated 10, 50, 100, 200 or 1000 times.

The present method can be used in the preparation of oligonucleotide sequences, either via synthesis or assembly. The device allows synthesis and movement of defined sequences. Using the present method the initiation sequences can be modified at a specific location above an electrode and the extended oligonucleotides prepared. The initiation sequences at different locations can be exposed to different nucleotides, thereby synthesising different sequences in different regions of the electrokinetic device.

After synthesis of a defined population of different sequences in different regions of the electrokinetic device, the sequences can be further assembled in longer contiguous sequences by joining two or more synthesised strands together.

Described herein is a method for preparing a contiguous oligonucleotide sequence of at least 2n bases in length comprising taking the electrokinetic device as described herein having a plurality of immobilised initiation oligonucleotide sequences, one or more of which contains a cleavage site, using the initiation oligonucleotide sequences to synthesise a plurality of immobilised oligonucleotide sequences of at least n bases in length, using cycles of extension of reversibly blocked nucleotide monomers, selectively cleaving at least two of the immobilised oligonucleotide sequences of least n bases in length into a reaction solution whilst leaving one or more of the immobilised oligonucleotide sequences attached, hybridizing at least two of the cleaved oligonucleotides to each other, to form a splint, and hybridizing one end of the splint to one of the immobilized oligonucleotide sequences and joining at least one of the cleaved oligonucleotides to the immobilised oligonucleotide sequences, thereby preparing a contiguous oligonucleotide sequence of at least 2n bases in length.

The steps of synthesis and assembly may involve high solute concentrations where the ionic strength would degrade the devices without the protecting conformal layer.

The method of moving aqueous droplets may also be used to help facilitate cell-free expression of peptides or proteins. In particular, droplets containing a nucleic acid template and a cell-free system having components for protein expression in an oil-filled environment can be moved using a method of the invention in the described electrokinetic device.

The present invention can be used to automate the movements of droplets in a cartridge. For example, droplets intended for analysis can be moved according to the present invention. The present invention could be incorporated into a cartridge used for local clinician diagnostics. For example it could be used in conjunction with nucleic acid amplification testing (NAAT) to determine nucleic acid targets in, for example, genetic testing for indications such as cancer biomarkers, pathogen testing for example detecting bacteria in a blood sample or virus detection, such as a coronavirus, e.g. SARS-CoV-2 for the diagnosis of COVID-19.

The device may be thermocycled to enable nucleic acid amplification, or the device may be held at a desired temperature for isothermal amplification. Having different sequences synthesised in different regions of the device allows multiplex amplification using different primers in different regions of the device.

Furthermore the invention can be used in conjunction with next generation sequencing in which DNA is synthesised by the addition of nucleotides and large numbers of samples are sequenced in parallel. The present invention can be used to accurately locate the individual samples used in next generation sequencing.

The invention can be used to automate library preparation for next generation sequencing. For example the steps of ligation of sequencing adaptors can be carried out on the device. Amplification of a selective subset of sequences from a sample can then have adaptors attached to enable sequencing of the amplified population.

Where used herein "and/or" is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A method of forming an electrokinetic device for moving an aqueous droplet, comprising:
- providing a first substrate having a matrix of electrodes, wherein each of the matrix electrodes is coupled to a thin film transistor;
- coating the matrix electrodes are overcoated with a functional coating comprising:
  - one or more dielectric layer(s) comprising silicon nitride, hafnium oxide or aluminum oxide in contact with the matrix electrodes,
  - a conformal layer comprising parylene in contact with the dielectric layer, and
  - a hydrophobic layer in contact with the conformal layer;
- providing a second substrate comprising a top electrode; and
- disposing a spacer between the first substrate and the second substrate to define an electrokinetic workspace.

2. The method of claim 1, further comprising coating the matrix electrodes with a plurality of layer(s) comprising silicon nitride, hafnium oxide or aluminium oxide in contact with the matrix electrodes.

3. The method of claim 1, wherein the dielectric layer is between 10 nm and 100 μm thick.

4. The method of claim 1, wherein the layered dielectric comprises:
- a first layer including an aluminum oxide or a hafnium oxide, the first layer having a thickness between 9 nm and 80 nm;
- a second layer including a tantalum oxide or a hafnium oxide, the second layer having a thickness between 40 nm and 250 nm; and
- a third layer including a tantalum oxide or a hafnium oxide, the third layer having a thickness between 5 nm and 60 nm, wherein the second layer is disposed between the first and third layers.

5. The method of claim 1, wherein the conformal layer is between 10 nm and 100 μm thick.

6. The method of claim 1, wherein the hydrophobic layer comprises any of a fluoropolymer coating, a fluorinated silane coating, manganese oxide polystyrene nanocomposite, zinc oxide polystyrene nanocomposite, precipitated calcium carbonate, a carbon nanotube structure, a silica nanocoating, or a slippery liquid-infused porous coating.

7. The method of claim 1, wherein the functional coating includes a dielectric layer comprising silicon nitride, a conformal layer comprising parylene, and a hydrophobic layer comprising an amorphous fluoropolymer.

8. The method of claim 1, further comprising coupling a controller to the electrokinetic device to regulate a voltage provided to the individual matrix electrodes.

9. The method of claim 8, wherein the electrokinetic device further includes a plurality of scan lines and a plurality of gate lines, wherein each of the thin film transistors is coupled to a scan line and a gate line, and the plurality of gate lines are operatively connected to the controller.

10. The method of claim 1, further comprising coating the top electrode with a second hydrophobic layer disposed on the second electrode.

11. The method of claim 10, wherein the first and second substrates are disposed so that the hydrophobic layer and the second hydrophobic layer face each other, thereby defining the electrokinetic workspace between the hydrophobic layer and the second hydrophobic layer.

12. A method for performing a droplet based assay on an electrokinetic device formed by the method of claim 1, wherein the method comprises repeatedly providing a differential electrical potential between a first of the matrix electrodes and a second of the matrix electrodes with a voltage source, thereby moving an aqueous droplet between the first of the matrix electrodes and the second of the matrix electrodes.

13. The method of claim 12, further comprising repeating the steps of claim 12 in order to add nucleotides to an initiation oligonucleotide.

14. The method of claim 12, further comprising repeating the steps of claim 12 in order to amplify nucleic acids within one or more droplets.

15. The method of claim 12, further comprising repeating the steps of claim 1 in order to join two or more nucleic acid strands in one or more droplets.

16. The method of claim 12, wherein the aqueous droplet is moved between the first matrix electrode and the second matrix electrode more than 1000 times.

17. The method of claim 12, wherein the aqueous droplet has an ionic strength greater than 0.1 M.

18. The method of claim 12, wherein the aqueous droplet has a volume of 1 μL or smaller.

19. The method of claim 12, further comprising:

disposing a second aqueous droplet on a third matrix electrode; and providing a differential electrical potential between the third matrix electrode and the second matrix electrode with the voltage source, thereby contacting the aqueous droplet with the second aqueous droplet.

20. The method of claim 1, further comprising coupling a voltage source to the matrix electrodes.

* * * * *